United States Patent
Wu et al.

(10) Patent No.: US 7,362,555 B2
(45) Date of Patent: Apr. 22, 2008

(54) ESD PROTECTION CIRCUIT FOR A MIXED-VOLTAGE SEMICONDUCTOR DEVICE

(75) Inventors: Chau-Neng Wu, Hsin-Chu (TW); Jian-Hsing Lee, Hsin-Chu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 81 days.

(21) Appl. No.: 11/509,998

(22) Filed: Aug. 26, 2006

(65) Prior Publication Data
US 2008/0055802 A1 Mar. 6, 2008

(51) Int. Cl.
*H02H 9/00* (2006.01)

(52) U.S. Cl. ............ 361/56; 361/91.1; 361/91.5; 361/111

(58) Field of Classification Search ........ 361/56, 361/91.1, 91.5, 111
See application file for complete search history.

(56) References Cited

U.S. PATENT DOCUMENTS

| | | | | |
|---|---|---|---|---|
| 4,855,863 A | * | 8/1989 | Yoshitake | 361/56 |
| 5,515,225 A | * | 5/1996 | Gens et al. | 361/56 |
| 6,002,568 A | * | 12/1999 | Ker et al. | 361/111 |
| 6,075,686 A | * | 6/2000 | Ker | 361/56 |
| 6,144,542 A | * | 11/2000 | Ker et al. | 361/111 |
| 6,236,549 B1 | * | 5/2001 | Peleska | 361/91.6 |
| 6,459,555 B1 | * | 10/2002 | Welbers et al. | 361/91.1 |
| 7,072,157 B2 | * | 7/2006 | Kitagawa | 361/56 |
| 7,072,158 B2 | * | 7/2006 | Wang | 361/56 |
| 7,110,228 B2 | * | 9/2006 | Chang | 361/56 |
| 7,187,527 B2 | * | 3/2007 | Su et al. | 361/56 |

* cited by examiner

*Primary Examiner*—Michael Sherry
*Assistant Examiner*—Terrence R. Willoughby
(74) *Attorney, Agent, or Firm*—Kirkpatrick & Lockhart Preston Gates Ellis LLP

(57) ABSTRACT

An ESD protection circuit is implemented for a semiconductor device having a first circuit system operating with a first power supply voltage and a first complementary power supply voltage, and a second circuit system operating with a second power supply voltage and a second complementary power supply voltage. The ESD protection circuit includes a first diode having an anode coupled to the first power supply voltage and a cathode coupled to a first node connecting the first circuit system and the second circuit system for preventing a crosstalk of current between the first power supply voltage and the second complementary power supply voltage. A first MOS transistor module is coupled between the first node and the first complementary power supply for selectively creating a current path from the first node to the first complementary supply voltage for dissipating an ESD current during an ESD event.

20 Claims, 2 Drawing Sheets

ESD PROTECTION CIRCUIT FOR A MIXED-VOLTAGE SEMICONDUCTOR DEVICE

BACKGROUND

The present invention relates generally to integrated circuit (IC) designs, and more particularly to an electrostatic discharge (ESD) protection circuit for a mixed-voltage semiconductor device.

ESD is one of the most prevalent causes for chip failures in both chip manufacturing and field operations. ESD can occur when the charges stored in machines or human bodies are discharged to the chip on contact or by static induction. A person can develop a very high static voltage, from a few hundred to several thousand volts, simply by walking across a room or by removing an IC from its plastic package, even when careful handling procedures are followed. The inadvertent presence of a sudden voltage spike in an IC can cause physical destruction of circuit features. The impact of ESD damage due to handling and testing can have a significant influence on the product yield.

Another issue that gives increasing importance to ESD control is the move towards replaceable ICs in electronic systems. Instead of replacing the whole circuit board, as used to be the standard practice, users are now encouraged to purchase upgrades to their microprocessors and memory cards and perform the installation themselves. Since the installation does not necessarily take place in an ESD-safe environment, the ICs need to be ESD robust.

An ESD protection circuit can be implemented for providing an energy dissipation path during an ESD event. As IC's become more complicated and, as a result, denser, the metal-oxide-semiconductor (MOS) circuit elements that make up the IC must become smaller. As the size of a MOS circuit element shrinks, its operating voltage also tends to drop. These elements operating with the lower voltage often need to interface with other circuit modules operating with higher voltages. The ESD protection circuits implemented for the MOS circuit elements operating with the lower voltage must be able to avoid having the oxides overstressed by the higher voltage of the other circuit modules during normal operation. At the same time, the ESD protection circuits must be turned on to provide an ESD current dissipation path during an ESD event. Because of the importance of ESD protection, it is desirable to improve and provide alternative ESD protection circuits.

As such, what is needed is an improved ESD protection circuit for a mixed-voltage semiconductor device.

SUMMARY

The present invention discloses an ESD protection circuit for a mixed-voltage semiconductor device. In one embodiment of the invention, the ESD protection circuit is implemented for a semiconductor device having a first circuit system operating with a first power supply voltage and a first complementary power supply voltage, and a second circuit system operating with a second power supply voltage and a second complementary power supply voltage that is equal to or higher than the first power supply voltage. The ESD protection circuit includes a first diode having an anode coupled to the first power supply voltage and a cathode coupled to a first node connecting the first circuit system and the second circuit system for preventing a crosstalk of current between the first power supply voltage and the second complementary power supply voltage. A first MOS transistor module is coupled between the first node and the first complementary power supply for selectively creating a current path from the first node to the first complementary supply voltage for dissipating an ESD current during an ESD event.

The construction and method of operation of the invention, however, together with additional objectives and advantages thereof will be best understood from the following description of specific embodiments when read in connection with the accompanying drawings.

DESCRIPTION

Figure 1:
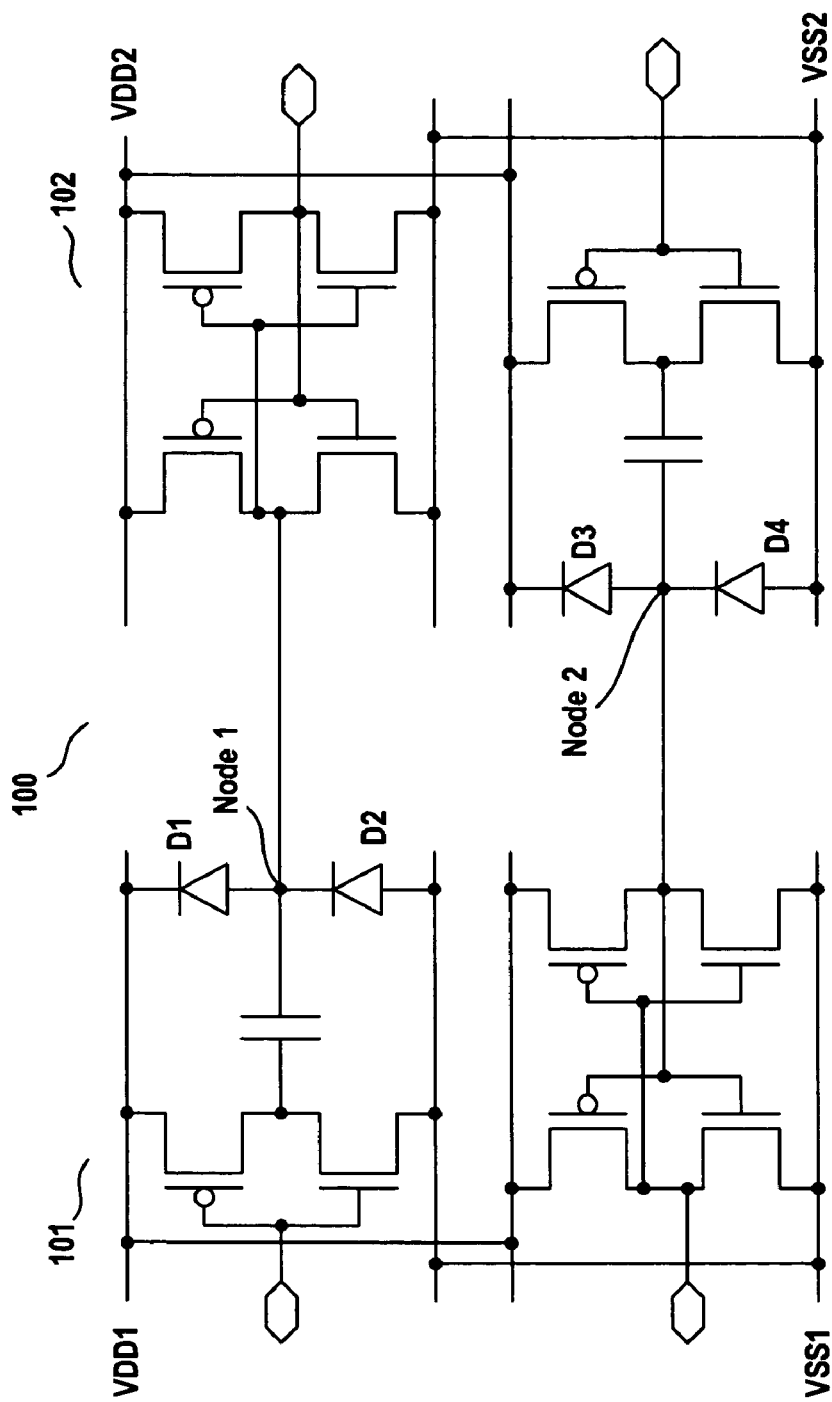
FIG. 1 schematically illustrates a conventional ESD protection circuit for a mixed-voltage semiconductor device.

FIG. 1 shows a conventional ESD protection circuit 100 for a mixed-voltage semiconductor device. The semiconductor device includes two circuit systems 101 and 102 that operate with difference voltages. For example, the circuit system 101 operates between a 9.4V supply voltage VDD1 and a 4.7V complementary supply voltage VSS1, and the circuit system 102 operates between a 14.1V supply voltage VDD2 and a 9.4V complementary supply voltage VSS2. The circuit systems 101 and 102 are interconnected via node 1 and node 2.

In the conventional ESD protection circuit 100, the circuit systems 101 and 102 are implemented with diode clamps for protecting the same against ESD currents. The ESD protection for the circuit system 101 is obtained by serially connecting diodes D1 and D2 among the node 1, power supply voltage VDD1, and complementary power supply voltage VSS1. The ESD protection for the circuit system 102 is obtained by serially connecting diodes D3 and D4 among the node 2, power supply voltage VDD2, and complementary power supply voltage VSS2.

Each of the diodes D1, D2, D3 and D4 is formed by a P-N-junction, and may be integrated on the same chip as the circuit 100. For protection against the positive ESD at node 1, the diode D1 has its anode (P-side) connected to node 1 and its cathode (N-side) connected to the power supply voltage VDD1. For protection against the negative ESD, the diode D2 has its cathode (N-side) connected to node 1 and the anode (P-side) connected to the complementary power supply voltage VSS1. Similarly, for protection against the positive ESD at node 2, the diode D3 has its anode (P-side) connected to node 2 and its cathode (N-side) connected to the power supply voltage VDD2. For protection against the negative ESD, the diode D4 has its cathode (N-side) connected to node 2 and the anode (P-side) connected to complementary power supply voltage VSS2.

ESD events can occur with either polarity between any pair of pins of an IC. For the negative ESD at node 1, the ESD current passes through diode D2 to the ground bus of the complementary power supply voltage VSS1. For the positive ESD at node 1, the ESD current passes through diode D1 to the power supply bus of power supply voltage VDD1. For the negative ESD at node 2, the ESD current passes through diode D4 to the ground bus of the complementary power supply voltage VSS2. For the positive ESD at node 2, the ESD current passes through diode D3 to the power supply bus of power supply voltage VDD2.

One main drawback of the conventional double diode ESD scheme is that the voltage mismatch between the circuit systems 101 and 102 causes it to fail during the normal operation. During the normal operation, the voltage at node 1, such as VDD2 and VSS2, can be higher than the VDD1 of the circuit system 101, making the diode D1 forward biased. Similarly, the voltage at node 2, such as VDD1 and VSS1, can be lower than VSS2 of the circuit system 102, making the diode D4 forward biased. The forward biased diodes D1 and D4 can cause system failures for the circuit 100. Hence the conventional double diode ESD protection scheme is not suitable for the mixed-voltage semiconductor device.

Figure 2:
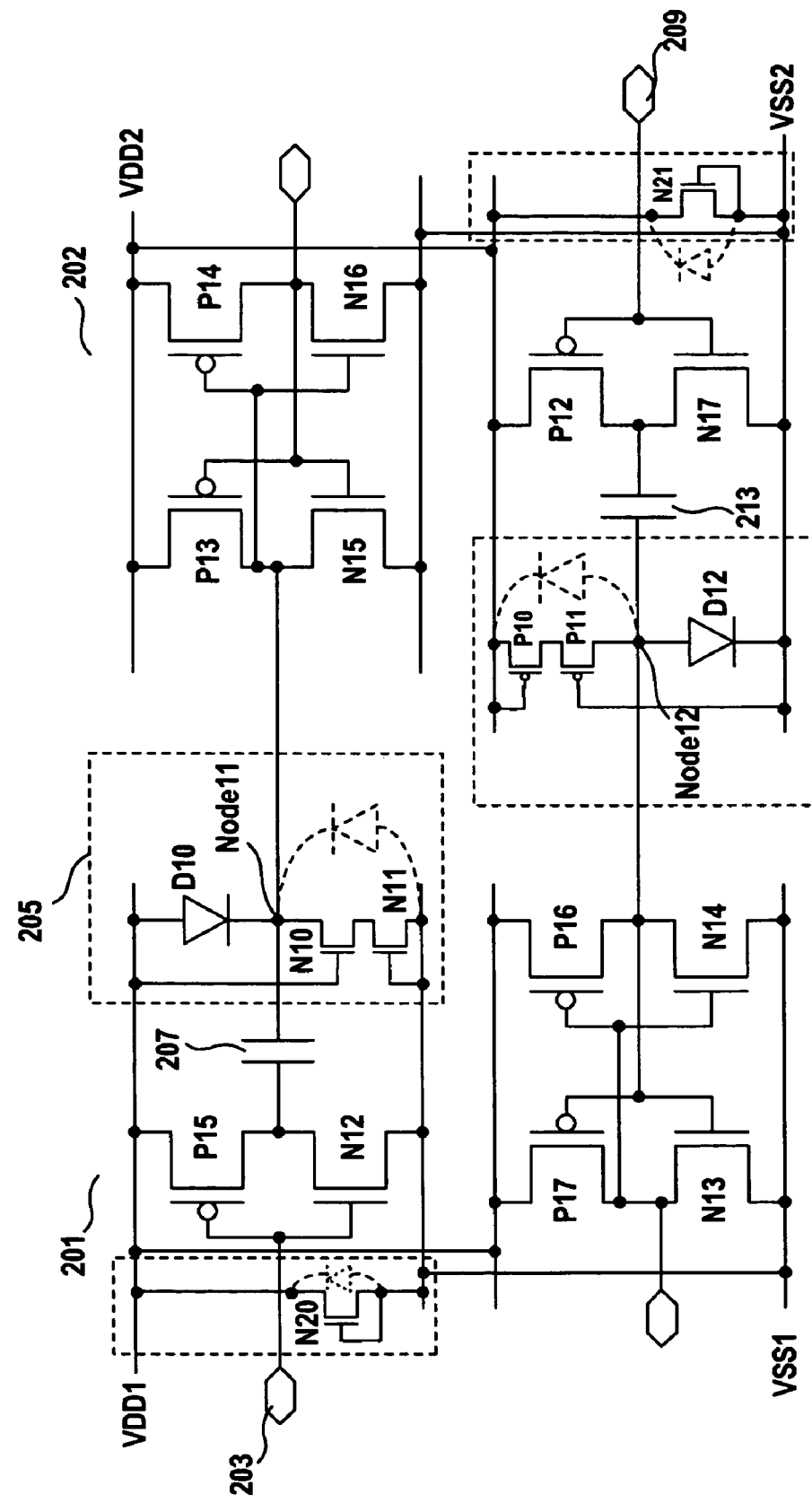
FIG. 2 schematically illustrates an ESD protection circuit for a mixed-voltage semiconductor device in accordance with one embodiment of the present invention.

FIG. 2 schematically illustrates an ESD protection circuit 200 for a mixed-voltage semiconductor device in accordance with one embodiment of the present invention. The semiconductor device includes two circuit systems 201 and 202 that operate with difference voltages. For example, the circuit system 201 operates between a 9.4V supply voltage VDD1 and a 4.7V complementary supply voltage VSS1, and the circuit system 202 operates between a 14.1V supply voltage VDD2 and a 9.4V complementary supply voltage VSS2. The circuit systems 201 and 202 are interconnected via node 11 and node 12.

The circuit system 201 includes a PMOS transistor P15 and an NMOS transistor N12 serially coupled between the supply voltage VDD1 and the complementary supply voltage VSS1. The PMOS transistor P15 has its source coupled to VDD1, and NMOS transistor N12 has its source coupled to VSS1. The gates of PMOS transistor P15 and NMOS transistor N12 are connected together, and further coupled to a pad 203. The drains of PMOS transistor P15 and NMOS transistor N12 are connected together, and further coupled to an ESD protection module 205 via a capacitor 207. In addition to the ESD protection module 205, a grounded-gate NMOS transistor N20 is coupled between VDD1 and VSS1 for further ESD protection capacity. The circuit system 201 also includes a latch constructed by PMOS transistors P17, P16, and NMOS transistors N13, N14, between VDD1 and VSS1 for storing a digital value therein.

The circuit system 202 includes a PMOS transistor P12 and an NMOS transistor N17 serially coupled between the supply voltage VDD2 and the complementary supply voltage VSS2. PMOS transistor P12 has its source coupled to VDD2, and NMOS transistor N17 has its source coupled to VSS2. The gates of PMOS transistor P12 and NMOS transistor N17 are connected together, and further coupled to a pad 209. The drains of PMOS transistor P12 and NMOS transistor N17 are connected together, and further coupled to an ESD protection module 211 via a capacitor 213. In addition to the ESD protection module 211, a grounded-gate NMOS transistor N21 is coupled between VDD2 and VSS2 for further ESD protection capacity. The circuit system 202 also includes a latch constructed by PMOS transistors P13, P14, and NMOS transistors N15, N16, between VDD2 and VSS2 for storing a digital value therein.

The ESD protection module 205 includes a reversely connected diode D10, which has its anode (P-side) connected to the power supply voltage VDD1 and its cathode (N-side) connected to node 11, and an NMOS transistor chain formed by transistors N10, N11 that are connected between node 11 and the complementary power supply VSS1. The gate of NMOS transistor N10 is connected to the power supply voltage VDD1 and the gate of NMOS transistor N11 is connected to the complementary power supply VSS1. The grounded gate NMOS transistor N20 is connected between the power supply voltage VDD1 and the complementary power supply VSS1.

The ESD protection module 211 includes a reversely connected diode D12, which has its anode (P-side) connected to node 12 and its cathode (N-side) connected to the complementary power supply VSS2, and a PMOS transistor chain formed by transistors P10, P11 that are connected between node 12 and the power supply voltage VDD2. The gate of PMOS transistor P10 is connected to the power supply voltage VDD2 and the gate of PMOS transistor P11 is connected to the complementary power supply VSS2. The grounded gate NMOS transistor N21 is connected between power supply voltage VDD2 and the complementary power supply VSS2.

The proposed embodiment of the present invention helps to avoid crosstalk at the circuit system 201. During normal operation, NMOS transistor N11 is turned off, and diode D10, which is reversely connected between node 11 and the power supply voltage VDD1, avoids the signal input from the circuit system 202 from passing to VDD1. Thus, the digital value stored in the latch constructed by PMOS transistors P13, P14 and NMOS transistors N15, N16 cannot pass to VDD1 or VSS1, thereby ensuring the circuit system 201 to function properly during the normal operation. The number of the NMOS transistors in the NMOS transistor chain depends on the voltage difference between node 11, which is either VDD2 or VSS2, and the complementary power supply VSS1. NMOS transistor N10 provides a voltage drop for the voltage passing thereacross. This helps to prevent NMOS transistor N11 from being overstressed. Thus, more NMOS transistors with gates connected to VDD1 can be inserted between NMOS transistor N10 and NMOS transistor N11 for further lowering the voltage passing from node 11 to VSS1.

The NMOS transistor chain connected between node 11 and the complementary power supply VSS1 functions as an ESD path for the positive ESD current. During a positive ESD event with respect to VSS1 at node 11, NMOS transistors N10 and N11 are forced to breakdown, thereby creating a current path for dissipating the ESD current from node 11 to VSS1. For a positive ESD event with respect to VDD1 at node 11, NMOS transistors N10 and N11 are forced to breakdown, and a parasitic diode at N20 is forward turned on, thereby creating a current path for dissipating the ESD current from node 11 to VDD1. During a negative ESD event with respect to VSS1 at node 11, the parasitic diode at N10, N11, and diode D10 are forward turned on. When the positive ESD current is present on the power line of VDD1, NMOS transistor N20 is forced to breakdown. When the negative ESD current is present on the power line of VDD1, the parasitic diode at N20 is forward turned on.

The proposed embodiment of the present invention also helps to avoid crosstalk at the circuit system 202. During normal operation, PMOS transistor P10 is turned off, and diode D12, which is reversely connected between node 12 and the complementary power supply voltage VSS2, avoids the complementary voltage VSS2 passing to node 12. Thus, the digital value stored in the latch constructed by PMOS transistors P17, P16 and NMOS transistors N13, N14 can be properly maintained during the normal operation. The number of the PMOS transistors in the PMOS transistor chain depends on the voltage difference between node 12, which is either VDD1 or VSS1, and the power supply VDD2. PMOS transistor P11 provides a voltage drop for the voltage passing thereacross. This helps to prevent PMOS transistor P10 from being overstressed. Thus, more PMOS transistors with gates connected to VDD2 can be inserted between PMOS transistor P10 and NMOS transistor P11 for further adjusting the voltage passing from node 12 to VDD2.

The PMOS transistor chain connected between node 12 and the power supply VDD2 functions as an ESD path for the negative ESD current. During a negative ESD event with respect to VDD2 at node 12, PMOS transistors P10 and P11 are forced to breakdown, thereby creating a current path for dissipating the ESD current from node 12 to VDD2. For a negative ESD event with respect to VSS2 at node 12, PMOS transistors P10 and P11 are forced to breakdown, and a parasitic diode at N21 is forward turned on, thereby creating a current path for dissipating the ESD current from node 12 to VSS2. During a positive ESD event with respect to VDD2 at node 12, the parasitic diode at P10, P11, and diode D12 are forward turned on. When the negative ESD current is present on the complementary power line of VSS2, NMOS transistor N21 is forced to breakdown. When the positive ESD current is present on the complementary power line of VSS2, the parasitic diode at N21 is forward turned on.

The proposed embodiment of the present invention provides an ESD protection circuit that allows a mixed-voltage semiconductor device to function properly in the normal operation. The number of MOS transistors in the ESD protection circuit can be adjusted according to the voltage difference between the high voltage circuit system and low voltage circuit system of the mixed-voltage semiconductor device, thereby preventing the same from being overstressed. The ESD protection circuits are implemented in both the high voltage circuit system and the lower voltage system for dissipating both the positive and negative ESD currents during the ESD event.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. An ESD protection circuit for a semiconductor device having a first circuit system operating with a first power supply voltage and a first complementary power supply voltage, and a second circuit system operating with a second power supply voltage and a second complementary power supply voltage that is equal to or higher than the first power supply voltage, the ESD protection circuit comprising:
   a first diode having an anode coupled to the first power supply voltage and a cathode coupled to a first node connecting the first circuit system and the second circuit system for preventing a crosstalk of current between the first power supply voltage and the second complementary power supply voltage; and
   a first MOS transistor module coupled between the first node and the first complementary power supply for selectively creating a current path from the first node to the first complementary supply voltage for dissipating an ESD current during an ESD event.

2. The ESD protection circuit of claim 1, wherein the first MOS transistor module comprises a first NMOS transistor having a source and gate coupled to the first complementary power supply voltage.

3. The ESD protection circuit of claim 2, wherein the first MOS transistor module comprises a second NMOS transistor having a source coupled to a drain of the first NMOS transistor, a drain coupled to the first node, and a gate coupled to the first power supply voltage.

4. The ESD protection circuit of claim 1, wherein the first MOS transistor module comprises a plurality of NMOS transistors whose number is determined by a voltage difference between the first complementary power supply voltage and a voltage at the first node.

5. The ESD protection circuit of claim 1 further comprising a first grounded gate NMOS transistor coupled between the first power supply voltage and the first complementary power supply voltage.

6. The ESD protection circuit of claim 1 further comprising a second diode having a cathode coupled to the second complementary power supply voltage and an anode coupled to a second node connecting the first circuit system and the second circuit system for preventing a crosstalk of current between the first power supply voltage and the second complementary power supply voltage.

7. The ESD protection circuit of claim 6 further comprising a second MOS transistor module coupled between the second node and the second power supply for selectively creating a current path from the second node to the second supply voltage for dissipating an ESD current during an ESD event.

8. The ESD protection circuit of claim 7, wherein the second MOS transistor module comprises a first PMOS transistor having a source and gate coupled to the second power supply voltage.

9. The ESD protection circuit of claim 8, wherein the second MOS transistor module comprises a second PMOS transistor having a source coupled to a drain of the first PMOS transistor, a drain coupled to the second node, and a gate coupled to the second complementary power supply voltage.

10. The ESD protection circuit of claim 7, wherein the second MOS transistor module comprises a plurality of PMOS transistors whose number is determined by a voltage difference between the second power supply voltage and a voltage at the second node.

11. The ESD protection circuit of claim 7, further comprising a second grounded gate NMOS transistor coupled between the second power supply voltage and the second complementary power supply voltage.

12. An ESD protection circuit for a semiconductor device having a first circuit system operating with a first power supply voltage and a first complementary power supply voltage, and a second circuit system operating with a second power supply voltage and a second complementary power supply voltage that is equal to or higher than the first power supply voltage, the ESD protection circuit comprising:
   a first diode having an anode coupled to the first power supply voltage and a cathode coupled to a first node connecting the first circuit system to the second circuit system for preventing a crosstalk of current between the first power supply voltage and the second complementary power supply voltage;
   a first MOS transistor module coupled between the first node and the first complementary power supply for selectively creating a current path from the first node to the first complementary supply voltage for dissipating an ESD current during an ESD event;

a second diode having a cathode coupled to the second complementary power supply voltage and an anode coupled to a second node connecting the first circuit system to the second circuit system for preventing a crosstalk of current between the first power supply voltage and the second complementary power supply voltage; and a second MOS transistor module coupled between the second node and the second power supply for selectively creating a current path from the second node to the second supply voltage for dissipating an ESD current during an ESD event.

13. The ESD protection circuit of claim 12, wherein the first MOS transistor module comprises a first NMOS transistor having a source and gate coupled to the first complementary power supply voltage.

14. The ESD protection circuit of claim 13, wherein the first MOS transistor module comprises a second NMOS transistor having a source coupled to a drain of the first NMOS transistor, a drain coupled to the first node, and a gate coupled to the first power supply voltage.

15. The ESD protection circuit of claim 12, wherein the first MOS transistor module comprises a plurality of NMOS transistors whose number is determined by a voltage difference between the first complementary power supply voltage and a voltage at the first node.

16. The ESD protection circuit of claim 12, wherein the second MOS transistor module comprises a first PMOS transistor having a source and gate coupled to the second power supply voltage.

17. The ESD protection circuit of claim 12, wherein the first MOS transistor module comprises a second PMOS transistor having a source coupled to a drain of the first PMOS transistor, a drain coupled to the second node, and a gate coupled to the second complementary power supply voltage.

18. The ESD protection circuit of claim 12, wherein the second MOS transistor module comprises a plurality of PMOS transistors whose number is determined by a voltage difference between the second power supply voltage and a voltage at the second node.

19. An ESD protection circuit for a semiconductor device having a first circuit system operating with a first power supply voltage and a first complementary power supply voltage, and a second circuit system operating with a second power supply voltage and a second complementary power supply voltage that is equal to or higher than the first power supply voltage, the ESD protection circuit comprising:

a first diode having an anode coupled to the first power supply voltage and a cathode coupled to a first node connecting the first circuit system to the second circuit system for preventing a crosstalk of current between the first power supply voltage and the second complementary power supply voltage;

a first MOS transistor module coupled between the first node and the first complementary power supply for selectively creating a current path from the first node to the first complementary supply voltage for dissipating an ESD current during an ESD event;

a first grounded gate NMOS transistor coupled between the first power supply voltage and the first complementary power supply voltage;

a second diode having a cathode coupled to the second complementary power supply voltage and an anode coupled to a second node connecting the first circuit system to the second circuit system for preventing a crosstalk of current between the first power supply voltage and the second complementary power supply voltage;

a second MOS transistor module coupled between the second node and the second power supply for selectively creating a current path from the second node to the second supply voltage for dissipating an ESD current during an ESD event; and a second grounded gate NMOS transistor coupled between the second power supply voltage and the second complementary power supply voltage.

20. The ESD protection circuit of claim 19, wherein the first MOS transistor module comprises a plurality of NMOS transistors whose number is determined by a voltage difference between the first complementary power supply voltage and a voltage at the first node, and the second MOS transistor module comprises a plurality of PMOS transistors whose number is determined by a voltage difference between the second power supply voltage and a voltage at the second node.

* * * * *